United States Patent [19]
Risse et al.

[11] Patent Number: 6,063,352
[45] Date of Patent: May 16, 2000

[54] METHOD OF REMOVING SULFUR DIOXIDE FROM FLUE GASES, ESPECIALLY POWER PLANT FLUE GASES AND FLUE GASES FROM GARBAGE INCINERATOR PLANTS

[75] Inventors: Theo Risse, Werne; Lourenço Ferrao, Dinslaken, both of Germany

[73] Assignee: Lurgi Lentjes Bischoff GmbH, Essen, Germany

[21] Appl. No.: 09/113,847

[22] Filed: Jul. 10, 1998

[30] Foreign Application Priority Data

Jul. 19, 1997 [DE] Germany .......................... 197 31 062

[51] Int. Cl.[7] .................................................. B01D 53/50
[52] U.S. Cl. ...................................... 423/243.06; 423/547
[58] Field of Search ................................. 423/243.06, 547

[56] References Cited

U.S. PATENT DOCUMENTS

| | | | |
|---|---|---|---|
| 3,927,178 | 12/1975 | Jordan et al. ........................ | 423/242 |
| 4,268,489 | 5/1981 | Haese .................................. | 423/242 |

FOREIGN PATENT DOCUMENTS

| | | |
|---|---|---|
| 0 005 270 A1 | 11/1979 | European Pat. Off. . |
| 0 212 523 A2 | 3/1987 | European Pat. Off. . |
| 0 620 187 A1 | 10/1994 | European Pat. Off. . |
| 0 778 067 A1 | 6/1997 | European Pat. Off. . |
| 37 33 319 A1 | 4/1989 | Germany . |
| 37 33 319 C2 | 4/1989 | Germany . |
| 48-19472 | 3/1973 | Japan ................................ 423/243.06 |
| 52-7870 | 1/1977 | Japan ................................ 423/243.06 |

*Primary Examiner*—Steven P. Griffin
*Assistant Examiner*—Timothy C Vanoy
*Attorney, Agent, or Firm*—Herbert Dubno

[57] ABSTRACT

$SO_2$ containing flue gas is scrubbed with a scrubbing solution made up from ammonia water, untreated ammonium sulfate scrubbing solution recycled from the bottom of the scrubbing zone and ammonium sulfate solution formed by oxidizing a portion of the recovered ammonium sulfite scrubbing solution. The ammonium sulfite/ammonium sulfate mixing ratio is maintained at 15:1 to 3:1. The ammonium sulfite containing scrub liquid in combination with aqueous ammonia and an ammonium sulfate solution which has undergone oxidation can have an unusually high sulfur dioxide absorption capacity while minimizing the formation of aerosols.

9 Claims, 1 Drawing Sheet

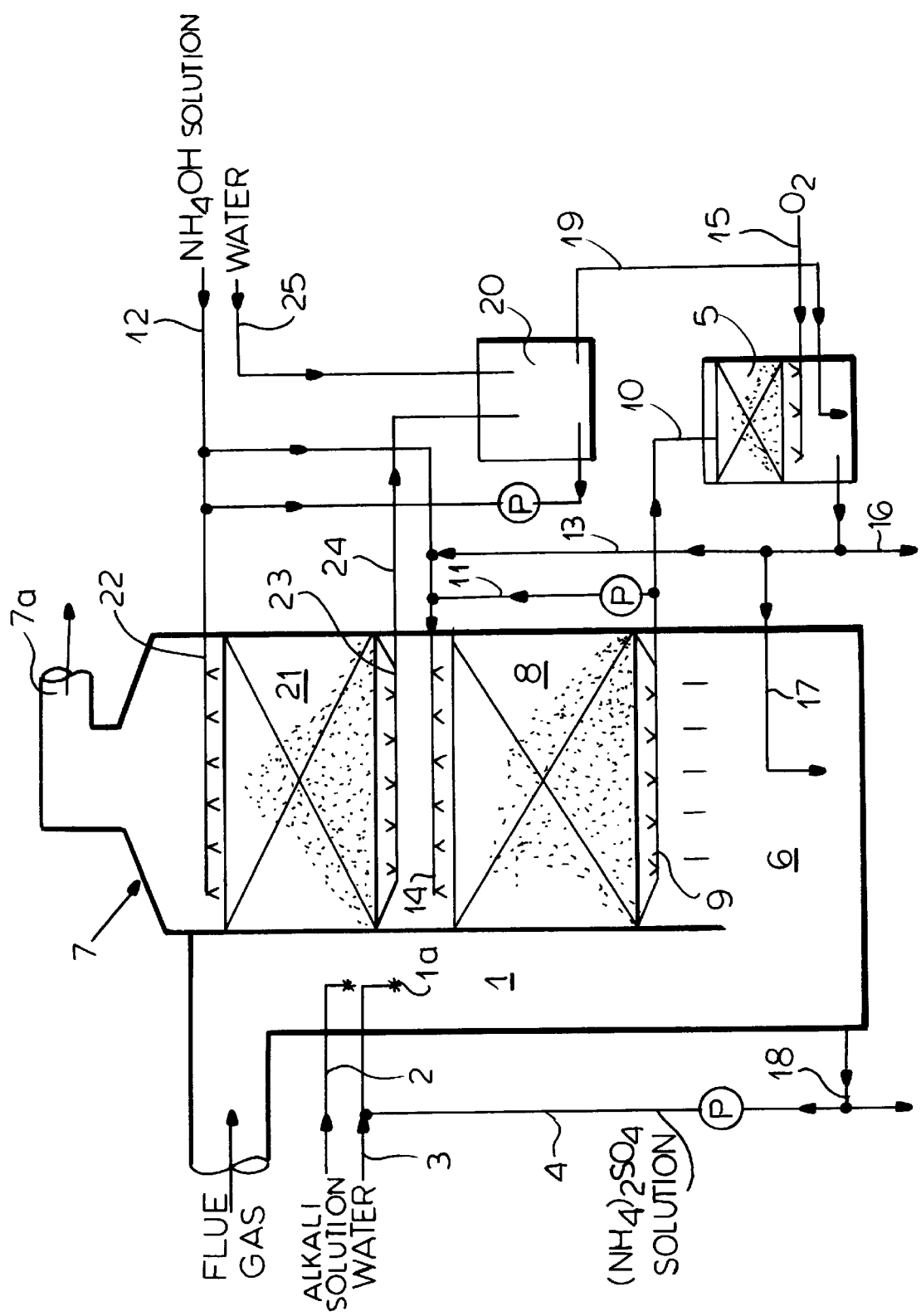

METHOD OF REMOVING SULFUR DIOXIDE FROM FLUE GASES, ESPECIALLY POWER PLANT FLUE GASES AND FLUE GASES FROM GARBAGE INCINERATOR PLANTS

FIELD OF THE INVENTION

The present invention relates to a process for removing sulfur dioxide from flue gases, especially the flue gas from fossil-fuel power plants and the flue gases of garbage incinerators.

BACKGROUND OF THE INVENTION

In the treatment of flue gases from fossil fuel power plants and from garbage incinerators and the like, it is common practice to scrub the flue gas by passing the flue gas from below upwardly through a scrubber having at least one scrubbing zone and in counterflow to an absorption which is supplied to an upper part of the scrubbing zone and which is withdrawn below the scrubbing zone. The absorption liquid can be circulated through a scrubbing liquid circulation path to the upper part of the scrubbing zone and ammoniacal water (aqueous ammonium hydroxide solution) can be supplied to the scrubbing liquid circulation. From this circulation, a portion can be branched and subjected to oxidation in an oxidation unit in which the ammonium sulfite (($NH_4)_2SO_3$) and the ammonium hydrogen sulfite ($NH_4HSO_3$) is oxidized to ammonium sulfate (($NH_4)_2SO_4$).

In the removal of sulfur dioxide from flue gases by scrubbing with aqueous ammonia solutions as the absorbent liquid, the following reactions take place:

$$SO_2+NH_3+H_2O \rightarrow NH_4HSO_3$$

$$NH_4HSO_3+NH_3 \rightarrow (NH_4)_2SO_3$$

$$(NH_4)_2SO_3+SO_2+H_2O \rightarrow 2NH_4HSO_3$$

$$(NH_4)_2SO_3+½O_2 \rightarrow (NH_4)_2SO_4$$

A result of the process is the saleable byproduct ammonium sulfite which has significant value as a fertilizer or an ingredient in fertilizers.

A process of this type is described in DE-C 37 33 319. The intermediate scrubbing zone of a three stage scrubber in this system has a scrubbing liquid circulation in which the absorber is aqueous ammonia solution and to which water is supplied for material balance, e.g. as make up water. From this circulation, a partial stream is branched and passed through the oxidation unit.

In the oxidation unit, the salts dissolved in the solution are oxidized to form the ammonium sulfate which can be recovered by evaporation of the aqueous phase and granulation. The result is an ammonium sulfate granulated product which can be used directly as a fertilizer and is a saleable product.

The circulated absorption liquid can develop a high concentration of dissolved salts (($NH_4)_2SO_3$ and $NH_4HSO_3$). The absorption liquid in the scrubbing zone has a high NH3 partial pressure which can give rise to aeresols which are detrimental to the health and represent an environmental pollutant.

In the earlier process, a third scrubbing zone is provided downstream of the scrubbing zone utilizing this recirculated ammoniacal solution and in which the scrubbing liquid is acidified by the addition of sulfuric acid, thereby washing out the ammonia to a permissible level thereof. The additional scrubbing zone for the elimination of $NH_3$ is expensive and in practice it is found that one cannot completely avoid aerosol formation, at least not to the desired degree.

EP-A 0 778 067 describes a process in which ammonium sulfate solution is used as the absorption liquid and in which the ammonium sulfate solution is drawn from a sump of the scrubber which is aerated with ambient air and is then returned at the head of the scrubbing column. The maximum possible oxidation level should be maintained in the scrubbing liquid in the sump. From the scrubbing liquid circulation, sufficient scrubbing solution is discharged to adjust the salt content of the scrubbing liquid to substantially 25 to 40% by weight. The absorption of $SO_2$ with the ammonium sulfate scrubbing process is, however, unsatisfactory. The scrubbing zone must be excessively long if the $SO_2$ remaining in the scrubbed flue gas is to be below the permissible tolerances.

Furthermore, the aerosol formation may reach tolerable levels, especially when the smoke which is treated has a high $SO_2$ concentration say more than 2700 mg/m$^3$ (STP). Similar processes are known from EP A 0 212 523 and EP A 0 620 187. In these processes as well, an ammonium sulfate solution forms the scrubbing liquid.

OBJECTS OF THE INVENTION

It is the principal object of the present invention to provide an improved process for the removal of sulfur dioxide from flue gases especially power plant flue gases and garbage incinerator flue gases whereby the drawbacks of earlier systems are avoided.

Another object of this invention is to provide an improved process of scrubbing sulfur dioxide from such flue gases that will enable the $SO_2$ content to be reduced to permissible limits but which, in addition, will minimize aeresol formation.

It is still another object of the invention to provide a highly economical method of scrubbing sulfur dioxide from flue gases.

SUMMARY OF THE INVENTION

These objects and others which will become apparent hereinafter are attained, in accordance with the invention in a method of scrubbing flue gases of fossil-fuel power plants and of garbage and incinerators which comprises passing the scrubbing liquid downwardly in counterflow to the rising flue gas to be scrubbed and supplying a scrubbing liquid at the top of the scrubbing zone which is constituted as a mixture of aqueous ammonia, ammonium-sulfite-containing scrubbing liquid which is withdrawn from the scrubber below the scrubbing zone and is recycled without intervening treatment, and ammonium sulfate solution which is returned from an oxidation device to which ammonium sulfite or ammonium hydrosulfite solution is fed from the scrubber. The mixing ratio between the ammonium sulfite (($NH_4)_2SO_3$ and the ammonium sulfate (($NH_4)_2SO_4$) mixed in the mixture should be 15:1 to 3:1 and is adjusted by regulating the mixture components and preferably should be in the range of 10:1 to 5:1.

It has been found, surprisingly, that ammonium sulfite containing scrubbing liquid in combination with aqueous ammonia and an ammonium sulfate solution which has undergone oxidation can have an unusually high $SO_2$ absorption power and also has no tendency for aerosol formation. The $SO_2$ is bound rapidly with ammonium sulfite in the scrubbing liquid of the invention in high concentrations, by forming $NH_4HSO_3$. An equilibrium is formed between the SO$_2$ from the flue gas, the NH$_3$ supplied with the aqueous ammonium and (NH$_4$)$_2$SO$_3$. The absorption of SO$_2$ with the scrubbing liquid of the invention is carried out more rapidly than absorption of aqueous ammonia alone or by a mixture by aqueous ammonia and ammonium sulfate solution. Because of the very rapid and effective absorption of SO$_2$, the velocity of the flue gas traversing the scrubber can be increased and/or one can operate with a short term scrubbing zone.

With the aid of the process of the invention, flue gases with high sulfur oxide contents can be efficiently cleaned. Indeed, it is possible to maintain the aerosol content in the scrubbed flue gas constant at a level below 15 mg/m$^3$ (STP) and in most cases even below 10 mg/M$^3$ (STP). Although the aerosol forming potential of the scrubbing liquid according to the invention is comparatively low, the proportion of ammonium sulfate can be comparatively high. The ammonium sulfate solution can be recycled so that the ammonia partial pressure of the ammonium sulfate relative to that of ammonium sulfite/ammonia hydrogen sulfite is significantly lower.

The ammonia water used can have an ammonia content between 10 and 30 weight % and it can be formed directly before use at the scrubbing site, by mixing ammonia with water. It can, however, be formed from other commercially available products. The amount of the aqueous ammonia solutions used is determined by the pH value of the scrubbing liquid. The pH value can be adjusted between pH 4.5 and pH 7. Preferably, the pH value of the scrubbing liquid at the start is set between pH 6 and pH 6.5 with adjustment of the pH value during operating being control by the addition of the aqueous ammonia.

The flow quantity of the ammonium sulfite containing solution fed to the scrubbing zone directly and bypassing the oxidation stage is so adjusted that the absorption liquid in the scrubbing zone has a substoichiometric quantity of (NH$_4$)$_2$SO$_3$ based upon the reaction (NH$_4$)$_2$SO$_3$+SO$_2$+H$_2$O→2NH$_4$HSO$_3$, for the binding of the sulfur dioxide quantity in the flue gas in the scrubbing zone.

Advantageously, the volume rate of flow of the ammonium sulfite containing scrubbing liquid is so controlled that the absorption liquid contains an ammonium sulfite concentration which is about 25% greater than stoichiometric quantity required for binding all of the SO$_2$ in accordance with that reaction.

In a preferred embodiment of the invention the scrubber in the scrubbing zone contains a filling of packing onto which the scrubbing liquid is trickled, sprayed or otherwise spread. The volume rate of flow of the scrubbing liquid itself can be empirically determined for the particular packing used.

The volume rate of flow of the liquid from the oxidation unit and hence the ammonium sulfate solution supplied to the scrubbing zone should satisfy the following mass balance:

$$m_{OX} = m - m_{WF} - m_{NH3}$$

wherein m$_{OX}$=the volume rate of flow of the ammonium sulfate solution recycled from the oxidation unit to the scrubbing zone.

m=amount of scrubbing solution fed to the bed of packing m$_{WF}$ amount of ammonium sulfite solution recycled to the scrubbing zone.

M$_{H3}$ amount of fresh aqueous ammonia added to the scrubbing solution.

From the oxidation unit, a partial stream of the ammonium sulfate solution is discharged. By controlling the amount of discharged ammonium sulfate solution, the salt content of the scrubbing liquid can be controlled. Preferably the ammonium sulfate solution discharged from the oxidation unit will have an (NH$_4$)$_2$SO$_4$ concentration of 25% by weight to 30% by weight.

The flue gas which is treated in accordance with the invention by any flue gas which, for example, may be produced by the combustion of anthracite coal, bituminous coal, lignite, petroleum coke, oil, refinery residues, garbage and like fuels in power plants, incinerators or the like.

The flue gas usually has a temperature of about 135° C. to 280° C. and is supplied by the combustion chamber to the scrubber by suitable ducts. When the gas is admitted to the scrubbing plant, it can contain toxic or noxius hydrohalogens like HCl and can be treated initially with an alkali solution, for example, lye (e.g. NaOH or KOH solution) in concurrent flow or uniflow, i.e. by spraying the alkalihydroxide into the gas in an amount sufficient to neutralize the hydrohalogens. According to a preferred embodiment of the invention, the flue gas prior to entry into the scrubbing zone is cooled by spraying quenching water and/or ammonium sulfate solution into it, thereby saturating the flue gas with water.

In a preferred embodiment of the process of the invention, the scrubbing liquid is withdrawn through a gas-permeable bottom below the scrubbing zone and the ammonium sulfate solution used for quenching is separated out in the sump. Ammonium sulfate solution is withdrawn from the scrubber sump and sprayed into the scrubbing gas stream as a quenching liquid. The ammonium sulfate solution is concentrated by the evaporation of water therefrom. By controlling the feed of the ammonium sulfate solution which is withdrawn from the oxidation unit and by withdrawing a partial stream of concentrated ammonium sulfate solution, the ammonium sulfate solution in the scrubber sump can be adjusted.

In this manner, it is possible to obtain ammonium sulfate solution concentrations up to 42% by weight. If higher concentrations are sought, a detrimental crystallization can occur. It has been found that the (NH$_4$)$_2$SO$_4$ crystals formed at higher concentrations are nonabsorbing in the scrubber and tend to form aeresols which can only be removed by expensive filtering units. At least a part of the concentrated ammonium sulfate solution withdrawn from the scrubber sump can be supplied to an ammonium sulfate recovery apparatus and can be converted to fertilizer.

The method of the invention thus comprises the steps of (a) passing a flue gas containing sulfur dioxide upwardly through at least one scrubbing zone of a scrubber in counterflow to a scrubbing liquid introduced at an upper portion of the zone and discharged from the scrubber at a lower portion of the zone;

(b) providing a scrubbing-liquid recirculation path between the lower portion of the zone and the upper portion thereof;

(c) branching at least a part of the scrubbing liquid discharged from the scrubber to an oxidation unit for oxidizing ammonium sulfite to ammonium sulfate in the part of the scrubbing liquid before returning the part branched through the oxidation unit to the scrubbing liquid;

(d) adding aqueous ammonia solution to the scrubbing liquid in the path;

(e) controlling steps (b), (c) and (d) so that the scrubbing liquid introduced to the zone at the upper portion thereof is a mixture of:

(1) aqueous ammonia solution,
(2) ammonium sulfite containing scrubbing liquid as discharged from the lower portion without intervening treatment, and
(3) ammonium sulfate solution from the oxidation unit; and (f) maintaining a mixing ratio of the ammonium sulfite and the ammonium sulfate in the scrubbing liquid introduced into the upper portion of the scrubbing zone at 15:1 to 3:1.

BRIEF DESCRIPTION OF THE DRAWING

The above and other features, and advantages of the invention will become more readily apparent from the following description, reference being made to the sole FIGURE of the accompanying drawing which is a flow diagram illustrating the process and schematically representing the scrubber in cross section.

SPECIFIC DESCRIPTION

In the apparatus shown in the drawing, flue gas from a plant of the type described is treated in uniflow with a NaOH or KOH solution over the quenching stretch and, more particularly, sprayed with the alkali solution introduced via line 2. Hydrohalogen compounds are thereby separated out or neutralized. In addition, the flue gas can be cooled by quenching with water supplied via line 3 and/or ammonium sulfate solution supplied by line 5 to spray heads represented at 1a. The gas is thus saturated with water vapor. The liquid which is used to quench the flue gas 1 is at a temperature in a range between 45 to 60° C. which determines the saturation temperature of the gas preferably the quenching liquid includes ammonium sulfate solution which has a concentration of 25 to 30% by weight, has been withdrawn from the oxidation unit 5 and collects in the sump 6 of a scrubber 7.

The cooled flue gas, saturated with water vapor and free from hydrohalogen compounds then flows through the scrubbing zone 8 of the scrubber 7. In the scrubbing zone 8 is the flue gas containing $SO_2$ is contacted according to the invention with a mixture of aqueous ammonia, aqueous ammonia sulfate solution and freshly formed ammonium sulfite solution. A partial stream of the absorption liquid, withdrawn via a gas permeable volume 9 from below the scrubbing zone 8 is fed via line 10 to the oxidation unit 5. There, with the aid of oxidizing gas such as an oxygen containing gas (air, oxygen enriched air or commercial grade oxygen) supplied via line 15, the ammonium sulfite and ammonium hydrogen sulfite in the liquid is converted to ammonium sulfate.

The other portion of the withdrawn scrubbing liquid is recycled via line 11 to the upper portion of the scrubbing zone 8. Ammonia water is supplied via line 12 to the circulation 11 and the line 13 feeds ammonium sulfate solution from the oxidation unit 5 to the recirculation path 11. A spray or trickling unit 14 deposits the mixture of solutions upon the packing in the scrubbing zone 9.

The packing in the scrubbing zone 8 increases the contact surface between the flue gas and the scrubbing liquid and thus promotes $SO_2$ absorption. The use of packing bodies, e.g. Raschig rings, enables the height of the scrubbing zone 8 and thus the overall height of the scrubber 4 to be reduced.

Other packing materials which are inert to acid gases can be used as well. In order to achieve an effective absorption of $SO_2$, the pH value of the scrubbing liquid as it is introduced into the scrubbing zone is adjusted by the ammonia water to a pH of 5 to pH 6.5.

The line 15 supplying the oxidizing agent to the oxidation unit 10 may be provided with a blower so that, for example, air introduced by it is brought into intensive contact with the $NH_4HSO_3/(NH_4)_2SO_3$ containing liquid. The resulting ammonium sulfate solution is collected in the sump of the oxidation unit S. The ammonium sulfate concentration is determined, by specific gravity or density measurement. The ammonium sulfate solution which is withdrawn has an ammonium sulfate concentration of 25 to 30 weight %. Via line 16 ammonium sulfate solution is withdrawn for recovery of ammonium sulfate, e.g. as a fertilizer. It may run to a distillation apparatus which separates the water from pure ammonium sulfate.

The partial stream of ammonium sulfate solution is fed at 17 to the sump 6 from which it is withdrawn via the recirculation path 18 as the quenching liquid to cool the flue gas, thereby increasing the concentration of ammonium sulfate in the sump solution to 42 weight %.

The quantity of liquid in the sump of the oxidation unit 8 can be held constant via a line 19 which supplies water or scrubbing liquid from a buffer container 20 which holds that volume constant.

In the system shown in the drawing, the scrubber 7 has a second scrubbing zone 21 also provided with a packing (and to which the scrubbing liquid is fed by spray unit 22). The scrubbing solution here has its pH adjusted to between pH4 and pH6 via the aqueous ammonia from line 12 or solution withdrawn from the buffer container 20. The scrubbing solution in the second zone contacts already purified gas which passes there through after the scrubbing zone 8.

The flue gas freed from acid components can be discharged at 7a through a droplet trapper or other unit separating out aerosols. However, a filter arrangement need not be used. The aerosol trapper can, alternatively, be a wet electrostatic filter.

The loaded scrubbing liquid from the second scrubbing zone is collected via a liquid connection bottom 23 and fed via line 24 to the buffer container 20. The liquid level in the sump of the buffer 20 can be controlled by the feed of water via line 25. The purified flue gas can then be discharged into the atmosphere in a chimney or stack.

We claim:
1. A method of removing sulfur dioxide from a flue gas, comprising the steps of:
(a) passing a flue gas containing sulfur dioxide upwardly through at least one scrubbing zone of a scrubber in counterflow to a scrubbing liquid introduced at an upper portion of said zone and discharged from said scrubber at a lower portion of said zone;
(b) providing a scrubbing-liquid recirculation path between said lower portion of said zone and said upper portion thereof;
(c) branching at least a part of said scrubbing liquid discharged from said scrubber to an oxidation unit for oxidizing ammonium sulfite to ammonium sulfate in said part of said scrubbing liquid before returning said part branched through said oxidation unit to the scrubbing liquid;
(d) adding aqueous ammonia solution to the scrubbing liquid in said path;
(e) controlling steps (b), (c) and (d) so that the scrubbing liquid introduced to said zone at the upper portion thereof is a mixture of:
(1) aqueous ammonia solution,
(2) ammonium sulfite containing scrubbing liquid as discharged from said lower portion without intervening treatment, and

(3) ammonium sulfate solution from said oxidation unit;

(f) maintaining a mixing ratio of the ammonium sulfite and the ammonium sulfate in the scrubbing liquid introduced into said upper portion of said scrubbing zone at 15:1 to 3:1; and (g) adjusting a pH of the scrubbing liquid introduced to said zone at the upper portion thereof between pH 4.5 and pH 7 with aqueous ammonia solution.

2. The method defined in claim 1 wherein the mixing ratio is maintained between 10:1 and 5:1.

3. The method defined in claim 1 wherein a quantity of ammonium sulfate containing scrubbing liquid discharged from said lower portion of said scrubbing zone and supplied directly to the upper portion of said scrubbing zone without intervening oxidation is so adjusted that the scrubbing liquid introduced to said zone at the upper portion thereof corresponds to a substoichiometric amount of ammonium sulfite based upon the formula $(NH_4)_2SO_3 + SO_2 + H_2O \rightarrow 2NH_4HSO_3$ for the binding of the quantity of $SO_2$ in the flue gas.

4. The method defined in claim 1 wherein said scrubbing zone is a zone containing a packing and supplied with scrubbing liquid at a volume rate of flow empirically optimized for said packing and wherein the amount of ammonium sulfate solution fed from said oxidation zone to said upper portion of said scrubbing zone is adjusted based upon the amount of absorption liquid fed to said packing.

5. The method defined in claim 1 wherein ammonium sulfate solution from said oxidation unit is withdrawn therefrom at an ammonium sulfate concentration of 25% by weight to 30% by weight.

6. The method defined in claim 1, further comprising the step of spraying quenching water into said flue gas before said flue gas enters said scrubbing zone to cool said flue gas and saturate said flue gas with water.

7. The method defined in claim 1, further comprising the step of spraying aqueous ammonium sulfate solution into said flue gas before said flue gas enters said scrubbing zone to cool said flue gas and saturate said flue gas with water.

8. The method defined in claim 7 wherein scrubbing liquid at the bottom of said scrubbing zone is withdrawn from said scrubber and the aqueous ammonium sulfate solution used to cool said gas is collected in a sump of said scrubber so that ammonium sulfate in said sump increases to a maximum ammonium sulfate concentration of 42% weight.

9. The method defined in claim 2 wherein the pH is adjusted to between pH 5 and pH 6.5.

* * * * *